A. A. HAVENHILL.
FRAME FOR SHOW CASES.
APPLICATION FILED MAR. 19, 1909.
936,451.
Patented Oct. 12, 1909.
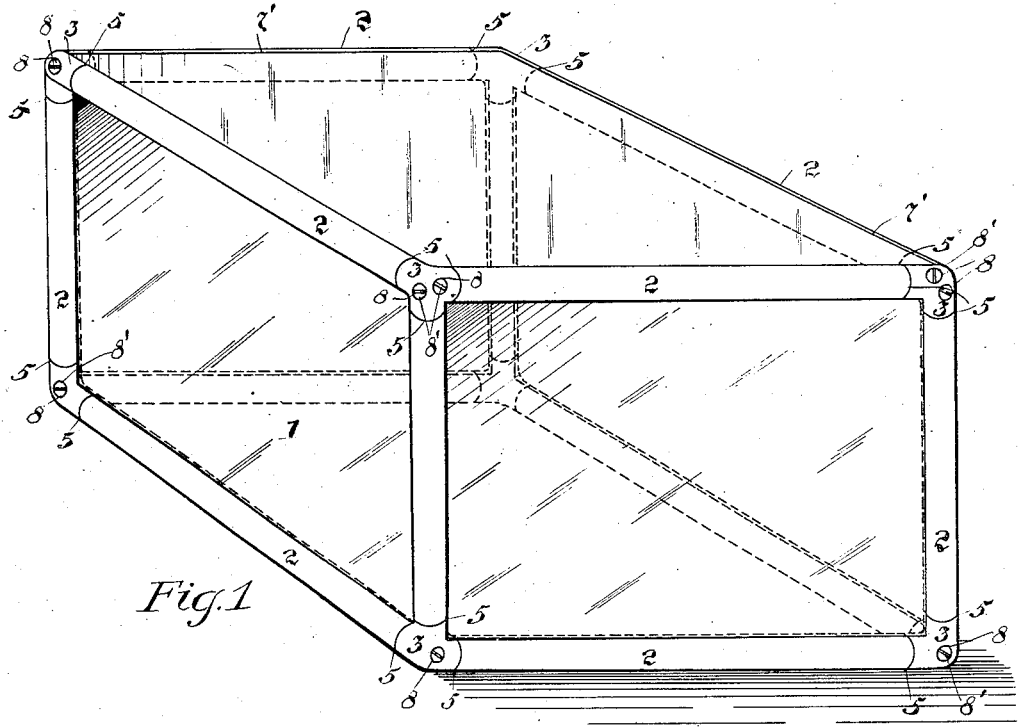
Fig. 1
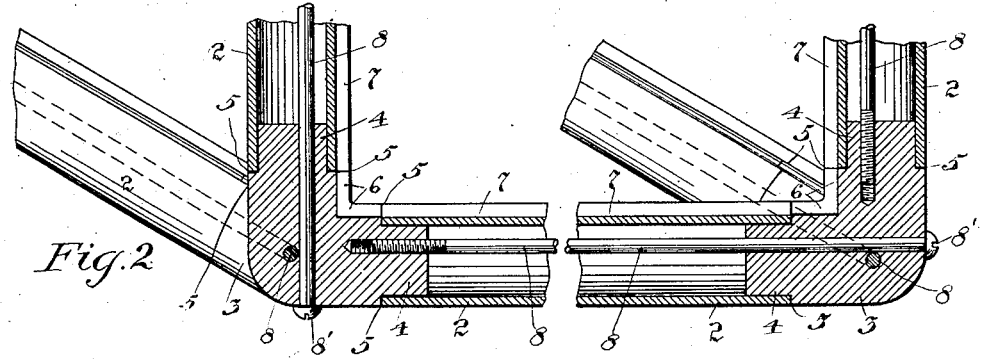
Fig. 2
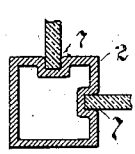 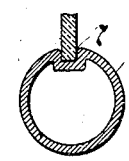 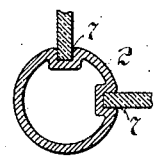 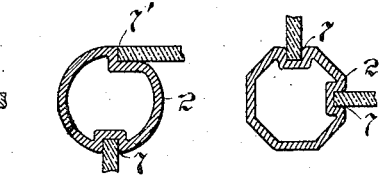
Fig. 6   Fig. 4   Fig. 3   Fig. 5   Fig. 7
Witnesses:
A. J. Graefe
W. E. Smith
Inventor:
Arthur A. Havenhill
By Joshua R. H. Potts
His Attorney

UNITED STATES PATENT OFFICE.

ARTHUR A. HAVENHILL, OF CHICAGO, ILLINOIS.

FRAME FOR SHOW-CASES.

936,451.

Specification of Letters Patent. Patented Oct. 12, 1909.

Application filed March 19, 1909. Serial No. 484,358.

*To all whom it may concern:*

Be it known that I, ARTHUR A. HAVENHILL, a citizen of the United States, residing at Chicago, county of Cook, and State of Illinois, have invented certain new and useful Improvements in Frames for Show-Cases, of which the following is a specification.

My invention relates to improvements in frames for show-cases or wind shields, and more particularly to tubular metal frames having solid metal corner pieces, and has for its object to provide a simple and inexpensive construction of this character that shall be strong, durable and of neat appearance.

A further object of my invention is to provide suitable screws for securing the tubular members of the frame to the corner pieces thereof.

Other objects will appear hereinafter.

With these objects in view my invention consists in the novel construction and arrangement of parts all as will be hereinafter fully described and particularly pointed out in the appended claims.

My invention will be more readily understood by reference to the accompanying drawings forming a part of this specification, and in which, Figure 1 is a perspective view of a show-case embodying my invention in its preferred form, Fig. 2 is a section thereof showing the disposition of the screws in the show-case frame, Figs. 3 and 4 are transverse sections showing U-shaped grooves formed in the tubular members of the frame for the reception of the glass side and end panels, Fig. 5 is a transverse section showing a V-shaped groove for the reception of the top glass panel, and Figs. 6 and 7 show respectively square and octagon tubes which may be used instead of the round tubes shown in Fig. 1.

Referring now to the drawings, 1 indicates the show-case and 2 the tubular members thereof. The corner pieces 3 are provided with reduced portions 4 and shoulders 5 to receive the ends of the tubes 2, and grooves 6 are formed in said corner pieces in alinement with the grooves 7 provided in said tubes. The grooves 7 are U-shaped in cross section and the grooves 7' V-shaped, the former being adapted to receive the side and end panels of the case and the latter the top panel thereof. Screws 8 connecting the corner pieces 3 are adapted to secure the same to the tubes 2, said screws being provided with slotted round heads 8'. The screw holes 9 in the corner pieces 3 are offset to prevent the screws 8 from interfering, this feature being clearly illustrated in Fig. 2.

While I have shown what I deem to be the preferable form of my invention, I do not wish to be limited thereto, as there might be modifications thereof which would be comprehended within the scope of my invention.

Having described my invention what I claim as new and desire to secure by Letters Patent is:

1. In a device of the class described, a frame comprising tubular members, solid metallic corner pieces having reduced portions adapted to enter the ends of said tubular members and shoulders abutting against the ends of said tubular members, and offset screw rods passing through the tubular members for holding the frame together, said rods passing loosely through the corner pieces at one end and screw threaded into the corner piece at the other end, substantially as and for the purposes specified.

2. In a device of the class described, a metallic substantially rectangular frame comprising a series of tubes having U-shaped and V-shaped longitudinal grooves formed therein, metal corner pieces having reduced portions and shoulders adapted to engage the ends of said tubes, said U-shaped grooves adapted to receive vertically disposed glass panels and said V-shaped grooves to receive a horizontally disposed glass panel, and offset screws adapted to secure said tubes to said corner pieces, substantially as and for the purposes specified.

In testimony whereof I have signed my name to this specification in the presence of two subscribing witnesses.

ARTHUR A. HAVENHILL.

Witnesses:
JOSHUA R. H. POTTS,
HELEN F. LILLIS.